UNITED STATES PATENT OFFICE.

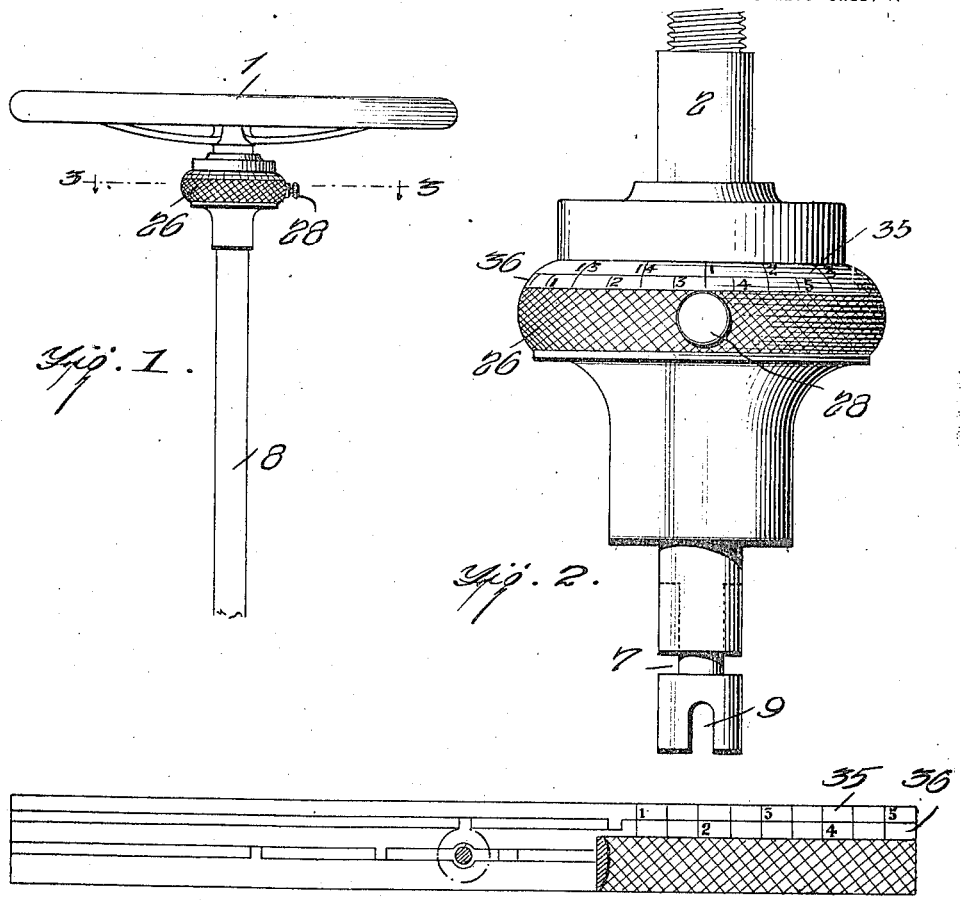

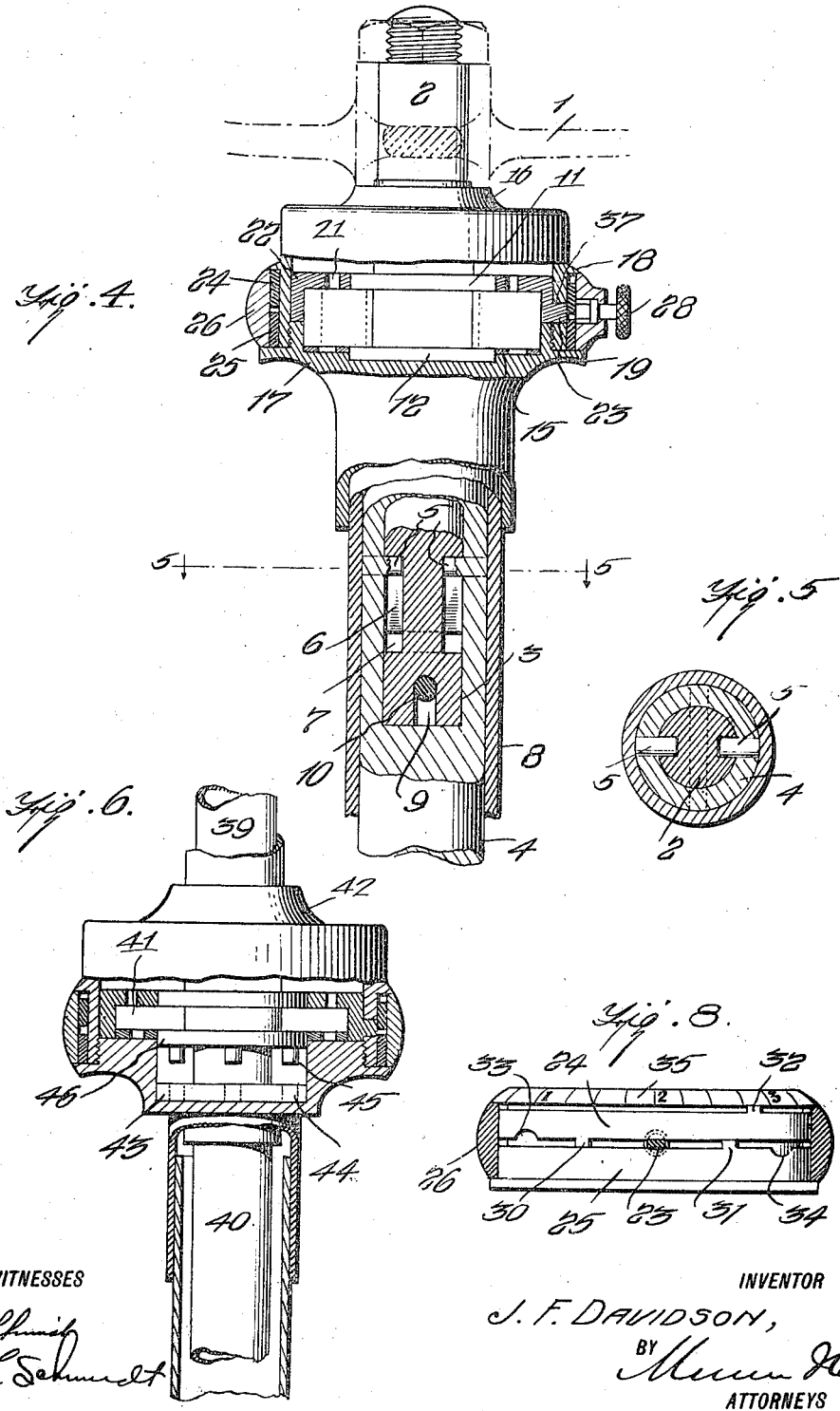

JAMES FRANKLIN DAVIDSON, OF DUNCAN, OKLAHOMA.

LOCK FOR AUTOMOBILE STEERING-WHEELS.

1,290,106.  Specification of Letters Patent.  Patented Jan. 7, 1919.

Application filed July 25, 1917. Serial No. 182,679.

*To all whom it may concern:*

Be it known that I, JAMES F. DAVIDSON, a citizen of the United States, and a resident of Duncan, in the county of Stephens and State of Oklahoma, have invented new and useful Improvements in Locks for Automobile Steering-Wheels, of which the following is a specification.

My invention is an improvement in locks for automobile steering wheels, and has for its object to provide a lock of the character specified and of the permutation type, by means of which a wheel may be locked to the steering column or released therefrom to prevent tampering with the automobile by unauthorized parties.

In the drawings:

Figure 1 is a front view of the improved lock in place;

Fig. 2 is an enlarged side view at right angles to Fig. 1;

Fig. 3 is a section on the line 3—3 of Fig. 1, looking in the direction of the arrows adjacent the line;

Fig. 4 is a vertical section;

Fig. 5 is a section on the line 5—5 of Fig. 4. looking in the direction of the arrows adjacent the line;

Fig. 6 is a view similar to Fig. 5, showing a modified form of connecting mechanism between the steering wheel spindle and the steering column;

Fig. 7 is a projection of the tumblers and their operating ring;

Fig. 8 is a side view of the ring and tumblers, with the ring in section.

In the embodiment of the invention shown in Figs. 1 to 5, the steering wheel 1 is secured to a spindle 2 whose lower end is received in a recess 3 in the top of the steering column 4. The steering column has oppositely arranged inwardly extending pins 5 which engage longitudinally extending grooves 6 in the portion of the spindle within the recess or socket 3, and at the lower ends of the grooves the said portion of the spindle has an annular groove 7 which, when the pins are in register therewith, will permit the spindle to rotate freely with respect to the steering column. This construction is especially adapted for use with solid steering columns, and the said column is inclosed by the usual housing 8.

The lower end of the spindle is transversely notched or recessed, as indicated at 9, and the steering column has a cross pin 10 which engages this recess when the spindle is connected to the steering column. The spindle 2 of the lock to be described is provided with spaced annular ribs 11 and 12, and when the spindle is clutched to the steering column the bolts of the locking mechanism engage between the ribs. When the spindle is unclutched from the steering column the bolts of the locking mechanism engage below the rib 12.

The locking mechanism comprises a pair of oppositely arranged arc-shaped bolts 13, each of which is pivoted at 14 at one end of the bolt to a ring 15 held in the sectional housing 16—17 that incloses the locking mechanism and forms a casing therefor. It will be noted from an inspection of Fig. 4 that the sections 16 and 17 of the lock housing have threaded engagement with each other, and each is marginally flanged, as shown at 18 and 19, respectively. It will be understood that these sections may be secured together in any desired manner to prevent tampering with the lock. Each bolt 13 has an eccentric slot 20, and these slots are engaged by pins 21 depending from a cam ring 22 which is mounted to rotate within the housing and is arranged concentric with the spindle. When this cam ring is moved in one direction the free ends of the bolts are swung outwardly, as shown in full lines in Fig. 3 to release the spindle while, when the ring is moved in the opposite direction, the free ends of the bolts are swung inwardly into the dotted line position of Fig. 3 to lock the spindle from longitudinal movement.

The cam ring has a lug 23 extending radially outward, and ring shaped tumblers 24 and 25 are mounted to rotate outside of the housing section 16, the said tumblers being arranged one above the other and being held in place by the flanges 18 and 19, and by an operating ring 26, to be described. This ring is corrugated or roughened externally, and is provided with a radial bearing 27 in which is mounted to move radially with respect to the spindle a headed pin 28, and the said pin is adapted to engage the lug 23 to operate the bolts. The bearing 27 is internally enlarged, as shown, and the pin has a stop head 29 within the enlargement, to limit the outward movement of the pin.

The tumblers 24 and 25 are spaced apart from each other slightly, as shown, and each tumbler has a lug 30 and 31, respectively, extending toward the opposite tumbler and adapted to interengage to constrain the tumblers to move together. The tumbler 24 has an upwardly extending lug 32 which is adapted to be engaged by a lug 33× on the ring 26, to permit the ring to move the tumblers. Each of the said tumblers is also provide with a rounded notch 33 and 34, respectively, in the edge adjacent to the other tumbler, and these notches are adapted to register to permit the passage of the pin 28 in order that the said pin may engage the lug 23.

A scale 35 is provided on the flange 18 of the housing section 16, and another scale 36 is provided on the ring 26. By means of these scales the position of the tumblers may be ascertained, that is, they may be moved to the proper position to permit the entrance of the pin 28 through the registering recesses 33 and 34, by one who knows the combination.

In operation, the combination being known, and with the spindle engaged with the steering column, it will be evident that the bolts will be engaged between the ribs 11 and 12. When now it is desired to release the steering wheel the ring 26 is turned to cause the lug 33× thereof to engage the lug 32 of the tumbler 24, and the ring and tumbler are turned in the proper direction until the lug 30 engages the lug 31, and the ring 26 comes to rest with that numeral on the scale 36 thereof at that graduation on the scale 35 which indicates to the operator that the recess 34 is at the proper point. A reverse movement of the ring 26 to the second number of the combination will cause the recess 33 to register with the recess 34. The pin 28 is now pushed in alongside the lug 23, and it is moved in the proper direction to cause the cam ring 22 to move the bolts outwardly, that is, to the right in the present instance. It will be noted that the lug 23 moves in a slot 37 in the housing section 16, and at its ends the slot is reduced, as shown at 38 in Fig. 3. Hence the lug 23 cannot be moved near enough to either end of the slot to prevent the entrance of the pin 28. As soon as the spindle is released it is drawn upwardly, to cause the pins 5 to enter the groove 7, at which time the rib 12 will be above the bolts and the headed pin, after being engaged with the opposite side of the lug 23, will be moved in the opposite direction to contract or swing inwardly the bolts, which are now engaged below the rib 12.

In Fig. 6 is shown a connection between the spindle 39 and the steering post 40 especially adapted for hollow posts or columns. In this construction the lock, indicated generally at 41 and corresponding in all respects to the lock shown in Fig. 4, is arranged within the sectional housing 42, corresponding to the housing 16—17. At its upper end the steering column 40 has a disk 43 which is provided with openings 44 for receiving depending pins 45 on the lower face of the rib 46 corresponding to the rib 12 of Fig. 4. In this construction, when the spindle is pushed downwardly, the pins 45 will engage the openings 44, locking the spindle to the column while, when the spindle is raised, the parts will be released.

I claim:

In combination with the steering column of a motor vehicle and the steering wheel, a spindle to which the wheel is secured, said wheel being mounted to move toward and from the column, and said column and spindle having interengaging mechanism for constraining them to move together, and means supported by the column for locking the spindle in either position, said inter-engaging mechanism comprising a socket in the column in which the spindle is moved, said socket having inwardly extending radial pins and the spindle having longitudinally extending grooves for engagement by the pins and having an annular groove at the lower ends of the longitudinal grooves to permit the spindle to rotate without affecting the column when the pins are in the said annular grooves.

JAMES FRANKLIN DAVIDSON.